(12) United States Patent
Takashima

(10) Patent No.: US 11,660,656 B2
(45) Date of Patent: May 30, 2023

(54) METHOD FOR MANUFACTURING VEHICLE WHEEL

(71) Applicant: CENTRAL MOTOR WHEEL CO., LTD., Anjo (JP)

(72) Inventor: Eiji Takashima, Anjo (JP)

(73) Assignee: CENTRAL MOTOR WHEEL CO., LTD., Anjo (JP)

(*) Notice: Subject to any disclaimer, the term of this patent is extended or adjusted under 35 U.S.C. 154(b) by 0 days.

(21) Appl. No.: 17/543,164

(22) Filed: Dec. 6, 2021

(65) Prior Publication Data

US 2022/0288668 A1    Sep. 15, 2022

(30) Foreign Application Priority Data

Mar. 9, 2021  (JP) .............................. JP2021-037394

(51) Int. Cl.
*B21D 53/34* (2006.01)
(52) U.S. Cl.
CPC ..................................... *B21D 53/34* (2013.01)
(58) Field of Classification Search
CPC ...................................................... B21D 53/34
See application file for complete search history.

(56) References Cited

U.S. PATENT DOCUMENTS

| 6,893,330 B2* | 5/2005 | Gatton ...................... B23B 5/02 |
| | | 451/29 |
| 6,997,787 B2* | 2/2006 | Gatton ...................... C25D 5/14 |
| | | 205/183 |
| 10,399,380 B2* | 9/2019 | Stebbins ................. C25D 13/06 |
| 2014/0138250 A1* | 5/2014 | Yoon ........................ B60B 19/00 |
| | | 164/76.1 |
| 2017/0320080 A1* | 11/2017 | Kakar ...................... B05B 7/201 |
| 2021/0023608 A1 | 1/2021 | Inatani |

FOREIGN PATENT DOCUMENTS

| CN | 106274279 B | * | 7/2018 |
| CN | 112296362 A | | 2/2021 |
| JP | 2017-226330 A | | 12/2017 |
| JP | 2018-127040 A | | 8/2018 |

OTHER PUBLICATIONS

CN-106274279-A, Li, Aluminum Alloy Car Wheels Comprises Spoke, Rim, Bead Seat, Lips, Bayonet, Bolt Hole And Valve Hole, The Wheel Rim Is Z-shaped Rim Comprising Z-shaped Starting Section, Reverse Transition Section And Z-shaped Extending Section, Published Jan. 2017.*

* cited by examiner

Primary Examiner — Sarang Afzali
(74) Attorney, Agent, or Firm — Oliff PLC

(57) ABSTRACT

A method manufactures a vehicle wheel that includes a wheel rim having a cylindrical shape and a wheel disc provided on an inner peripheral side of the wheel rim. The method includes forming a workpiece of the vehicle wheel by casting or forging, the workpiece being a metal alloy workpiece; cutting a part of the workpiece to form a cut surface; coating, with a colored paint, the cut surface, an edge where the cut surface intersects a surface of the workpiece, and at least a portion around the edge in the surface of the workpiece; and chamfering the edge to form a bright surface where the workpiece is exposed, after coating the cut surface, the edge, and at least the portion around the edge.

3 Claims, 7 Drawing Sheets

METHOD FOR MANUFACTURING VEHICLE WHEEL

CROSS-REFERENCE TO RELATED APPLICATION

This application claims priority to Japanese Patent Application No. 2021-037394 filed on Mar. 9, 2021, incorporated herein by reference in its entirety.

BACKGROUND

1. Technical Field

The technology described in the disclosure relates to a method for manufacturing a vehicle wheel.

2. Description of Related Art

There is known a method for manufacturing a vehicle wheel in which a bright surface where a metal workpiece is exposed is formed by machining, on a lathe, the surface of a coated light metal wheel together with a coated film to enhance a design property. Since the bright surface is formed by machining on the lathe, the bright surface can be provided only at an outermost part of the vehicle wheel. Therefore, the bright surface is a simple flat surface or a simple curved surface. A method for manufacturing a vehicle wheel having a bright surface in a more complex shape is disclosed in, for example, each of Japanese Unexamined Patent Application Publication No. 2017-226330 (JP2017-226330 A) and Japanese Unexamined Patent Application Publication No. 2018-127040 (JP 2018-127040 A). In this method, a machining center is used to enhance the design property of the bright surface. The bright surface is formed by moving a cutting tool along a three-dimensional shape of the wheel, or a three-dimensionally curved bright surface is formed by changing a rotational axis of the cutting tool.

SUMMARY

As a result of extensive studies, the inventor has newly found that a vehicle wheel having a high design property (i.e., a vehicle wheel with a good appearance) can be manufactured by a manufacturing method different from the related-art manufacturing methods.

A technology that can solve the problem described above is disclosed herein.

The technology disclosed herein can be implemented in the following manner.

(1) A method for manufacturing a vehicle wheel according to an aspect of the disclosure is a method for manufacturing a vehicle wheel including a wheel rim having a substantially cylindrical shape and a wheel disc provided on an inner peripheral side of the wheel rim. The method includes forming a workpiece of the vehicle wheel by casting or forging, the workpiece being a light metal workpiece; cutting a part of the workpiece to form a cut surface; coating, with a colored paint, the cut surface, an edge where the cut surface intersects a surface of the workpiece, and at least a portion around the edge in the surface of the workpiece; and chamfering the edge to form a bright surface where the workpiece is exposed, after coating the cut surface, the edge, and at least the portion around the edge.

In the method for manufacturing the vehicle wheel according to the aspect described above, it is possible to form the bright surface that linearly extends along a boundary between the cut surface and the surface of the workpiece. The cut surface and the surface of the workpiece are coated with the colored paint, and the workpiece is exposed in the bright surface. Thus, it is possible to manufacture a visually emphasized vehicle wheel having a high design property (i.e., having a good appearance).

(2) In the method for manufacturing the vehicle wheel according to the aspect described above, in chamfering the edge, the edge may be chamfered by machining. Since the bright surface formed in the chamfering step in the method for manufacturing the vehicle wheel extends linearly, the appearance is likely to deteriorate when the width of the bright surface varies greatly. Therefore, it is necessary to reduce the rate of change in the width of the bright surface. In the method for manufacturing the vehicle wheel according to the aspect described above, the variation in the width of the linearly extending bright surface can be reduced by the machining as compared to, for example, a case where chamfering is performed manually.

The technology described in the disclosure can be implemented in various forms or manners. For example, the technology can be implemented as a vehicle wheel or its manufacturing method.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is an explanatory drawing schematically illustrating a YZ sectional structure of the vehicle wheel 100a.

DETAILED DESCRIPTION OF EMBODIMENTS

A. First Embodiment

A-1. Structure of Vehicle Wheel 100

Figure 1:
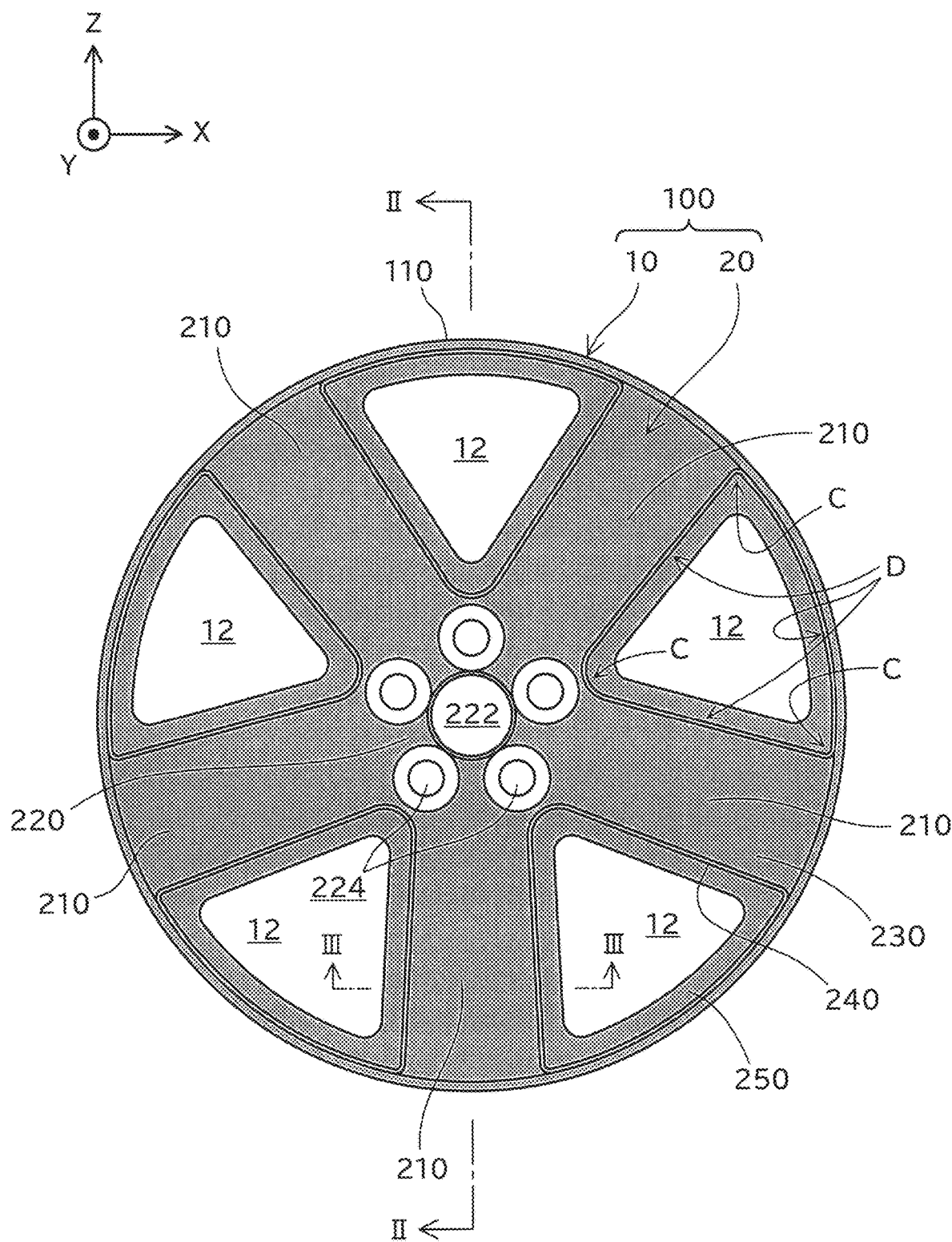
FIG. 1 is an XZ plan schematically illustrating the external structure of a vehicle wheel 100 according to a first embodiment.
Figure 2:
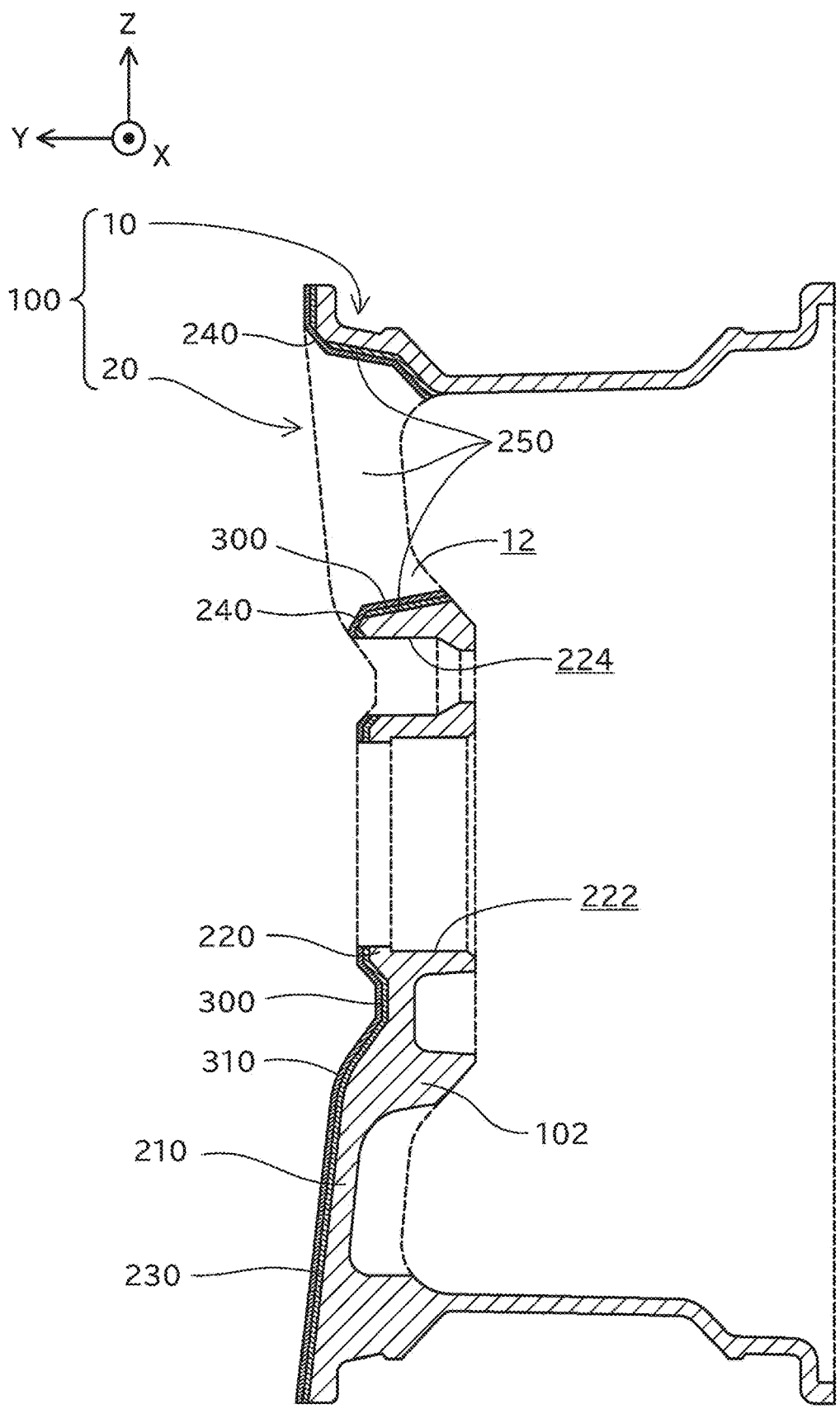
FIG. 2 is an explanatory drawing schematically illustrating a YZ sectional structure of the vehicle wheel 100.
Figure 3:
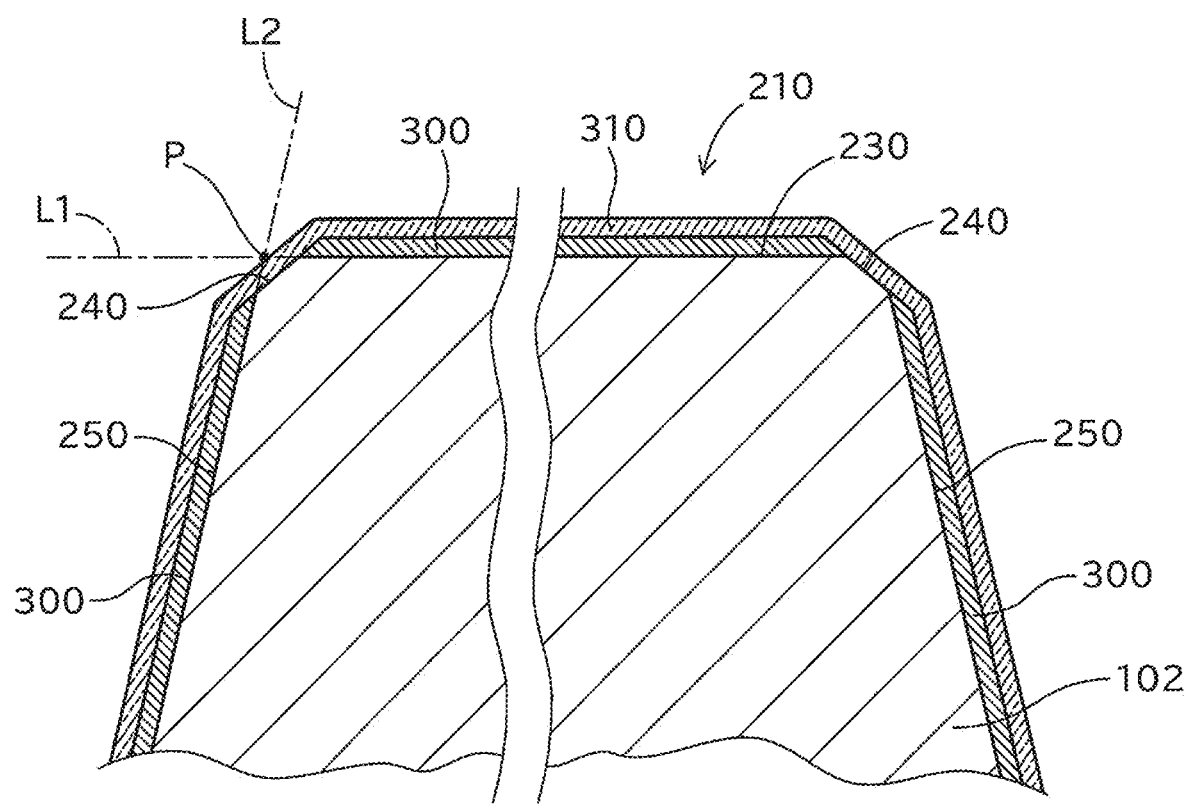
FIG. 3 is an explanatory drawing schematically illustrating an XY sectional structure of the vehicle wheel 100.

FIG. 1 is an XZ plan schematically illustrating the external structure of a vehicle wheel 100 (hereinafter referred to simply as "wheel 100") according to a first embodiment. FIG. 2 is an explanatory drawing schematically illustrating a YZ sectional structure of the wheel 100. FIG. 2 illustrates a YZ sectional structure of the wheel 100 at a position II-II in FIG. 1. FIG. 3 is an explanatory drawing schematically illustrating an XY sectional structure of the wheel 100 according to this embodiment. FIG. 3 illustrates an XY sectional structure of a spoke 210 of the wheel 100 at a position III-III in FIG. 1. In the drawings, X, Y, and Z axes orthogonal to each other are illustrated to determine directions. For convenience, a Y-axis direction is herein parallel to a rotational axis of the wheel 100, and is hereinafter referred to as "wheel axial direction". In actuality, the wheel 100 may be disposed in a direction different from the Y-axis direction. The same applies to FIG. 5 described later. A radial direction of the wheel 100 is hereinafter referred to as "wheel radial direction". A circumferential direction about the rotational axis of the wheel 100 is hereinafter referred to as "wheel circumferential direction".

As illustrated in FIG. 2, the wheel 100 has a color coat layer 300 and a clear coat layer 310 on the surface of a wheel workpiece 102. The wheel workpiece 102 is formed in a forming step described later, and then subjected to a coating step and a chamfering step to obtain a wheel 100. For convenience, the workpiece of the wheel 100 used in each step is referred to as "wheel workpiece 102".

The wheel workpiece 102 is made of a light metal such as an aluminum alloy or a magnesium alloy. The wheel workpiece 102 includes a substantially cylindrical wheel rim 10 and a wheel disc 20 disposed on an inner peripheral side of the wheel rim 10. The wheel workpiece 102 of this embodiment is a so-called one-piece wheel in which the wheel rim 10 and the wheel disc 20 are formed integrally. One side of the wheel 100 (wheel workpiece 102) in the wheel axial direction (positive side in the Y-axis direction) is hereinafter referred to as "outer side". The other side of the wheel 100 (wheel workpiece 102) in the wheel axial direction (negative side in the Y-axis direction) is hereinafter referred to as "inner side". When the wheel 100 is mounted on a vehicle body (not illustrated), the outer side of the wheel 100 is oriented opposite to the vehicle body, and the inner side of the wheel 100 is oriented toward the vehicle body. A surface of the wheel 100 on the outer side is a design surface.

As illustrated in FIG. 1, the wheel rim 10 has a substantially cylindrical shape in whole, and includes a cylinder portion (not illustrated) and a pair of flanges 110 (FIG. 1 illustrates only the flange 110 on the outer side). The cylinder portion has a cylindrical shape with a well portion or the like. Each of the flanges 110 has a substantial ring shape when viewed in the wheel axial direction (Y-axis direction). The flanges 110 are respectively positioned at both ends of the cylinder portion in the wheel axial direction. The flanges 110 retain a tire (not illustrated) attached to the wheel 100 to prevent misalignment (displacement) in the wheel axial direction.

The wheel disc 20 is positioned on the outer side of the wheel rim 10, and includes a hub attachment portion 220 and a plurality of (five in this embodiment) spokes 210. The hub attachment portion 220 has a substantial disc shape, and is positioned at the substantially center of the wheel disc 20 when viewed in the wheel axial direction (Y-axis direction). The hub attachment portion 220 has a hub bore 222 at the substantially center. A hub (not illustrated) of the vehicle body is coupled to the hub bore 222. A plurality of bolt holes 224 is formed around the hub bore 222 to fix the wheel 100 to the hub of the vehicle body.

The spokes 210 are radially arranged between the wheel rim 10 and the hub attachment portion 220. Each spoke 210 extends in the wheel radial direction. An opening (air hole) 12 is formed between adjacent spokes 210. The opening 12 has a substantially triangular shape, but the shape is not limited to the triangular shape, and may be, for example, a substantially rectangular shape. Each spoke 210 extends to the flange 110 of the wheel rim 10.

The wheel 100 has bright surfaces 240 that enhance the design property of the wheel 100 (i.e., bright surfaces 240 that make the appearance of the wheel 100 excellent) by linear brightness. Specifically, as illustrated in FIG. 1, the outer surface (design surface) of the wheel workpiece 102 on the outer side includes a cut surface 230, a plurality of bright surfaces 240, and a plurality of inclined surfaces 250.

The cut surface 230 is such a surface that the normal to the cut surface 230 extends in a direction parallel to or intersecting the wheel axial direction. Specifically, the cut surface 230 is positioned on the outermost side at the hub attachment portion 220 and the spokes 210 in the outer surface of the wheel workpiece 102 on the outer side. The cut surface 230 is a flat surface substantially perpendicular to the wheel axial direction. Each inclined surface 250 is a frame-shaped portion defining the opening 12 in the outer surface of the wheel workpiece 102 on the outer side. Each inclined surface 250 is inclined with respect to the cut surface 230. Specifically, as illustrated in FIG. 2 and FIG. 3, the inclined surface 250 is inclined with respect to the wheel axial direction (Y-axis direction) to increase an open area of the opening 12 toward the outer side. The inclined surface 250 may be planar or curved.

Each bright surface 240 is a linear portion positioned at a boundary between the cut surface 230 and the inclined surface 250. The bright surface 240 includes a portion whose angle with respect to the wheel axial direction (Y-axis direction) differs from angles of the cut surface 230 and the inclined surface 250 with respect to the wheel axial direction. Specifically, the bright surface 240 is substantially planar, and an inclination angle of the bright surface 240 with respect to the wheel axial direction is between an inclination angle of the cut surface 230 with respect to the wheel axial direction and an inclination angle of the inclined surface 250 with respect to the wheel axial direction. In a cross section substantially perpendicular to a longitudinal direction of the bright surface 240 (for example, an XY section in FIG. 3), the bright surface 240 is positioned closer to the wheel workpiece 102 (spoke 210) than an intersection P of an extension line L1 of the cut surface 230 and an extension line L2 of the inclined surface 250 (see FIG. 3) is.

The color coat layer 300 is formed by coating the cut surface 230 and each inclined surface 250 with a colored paint. The color coat layer 300 is not formed on each bright surface 240, and the wheel workpiece 102 (base) is exposed. That is, the bright surface 240 is a linear portion having two sides adjoining the coated surfaces (cut surface 230 and inclined surface 250) coated by the color coat layer 300. In other words, the coated surfaces (cut surface 230 and inclined surface 250) are disposed on respective sides of the bright surface 240. For example, the width of the bright surface 240 is equal to or larger than 0.3 mm. For example, the width of the bright surface 240 is equal to or smaller than 2 mm. In other words, for example, the width of the bright surface 240 is in a range of 0.3 mm to 2 mm.

The clear coat layer 310 is formed by coating with a light transmissive paint. The clear coat layer 310 is formed over the entire outer surface of the wheel 100 on the outer side (i.e., over the cut surface 230, bright surfaces 240, and inclined surfaces 250).

A-2. Method for Manufacturing Wheel 100

Figure 4:
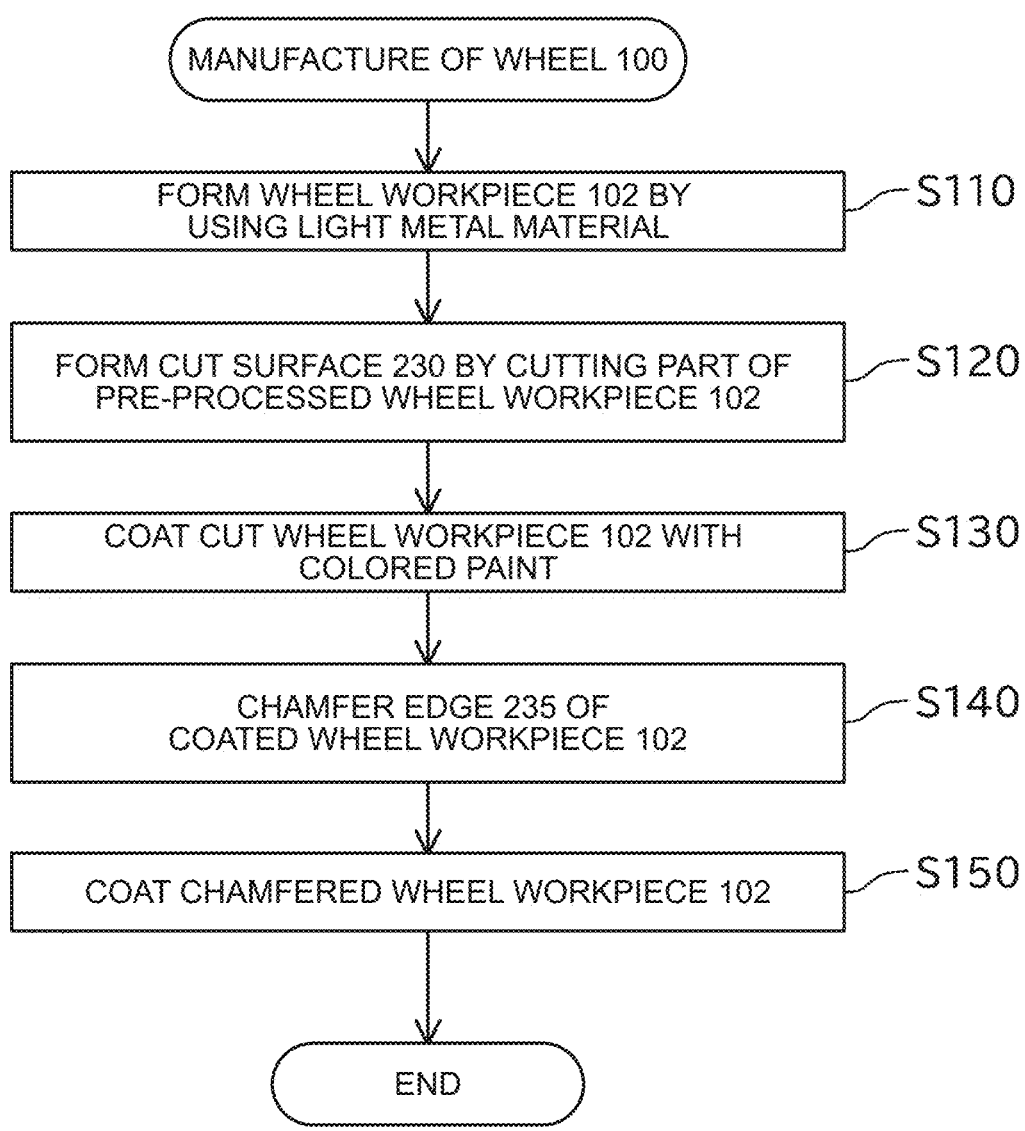
FIG. 4 is a flowchart illustrating a process for manufacturing the vehicle wheel 100.
Figure 5:
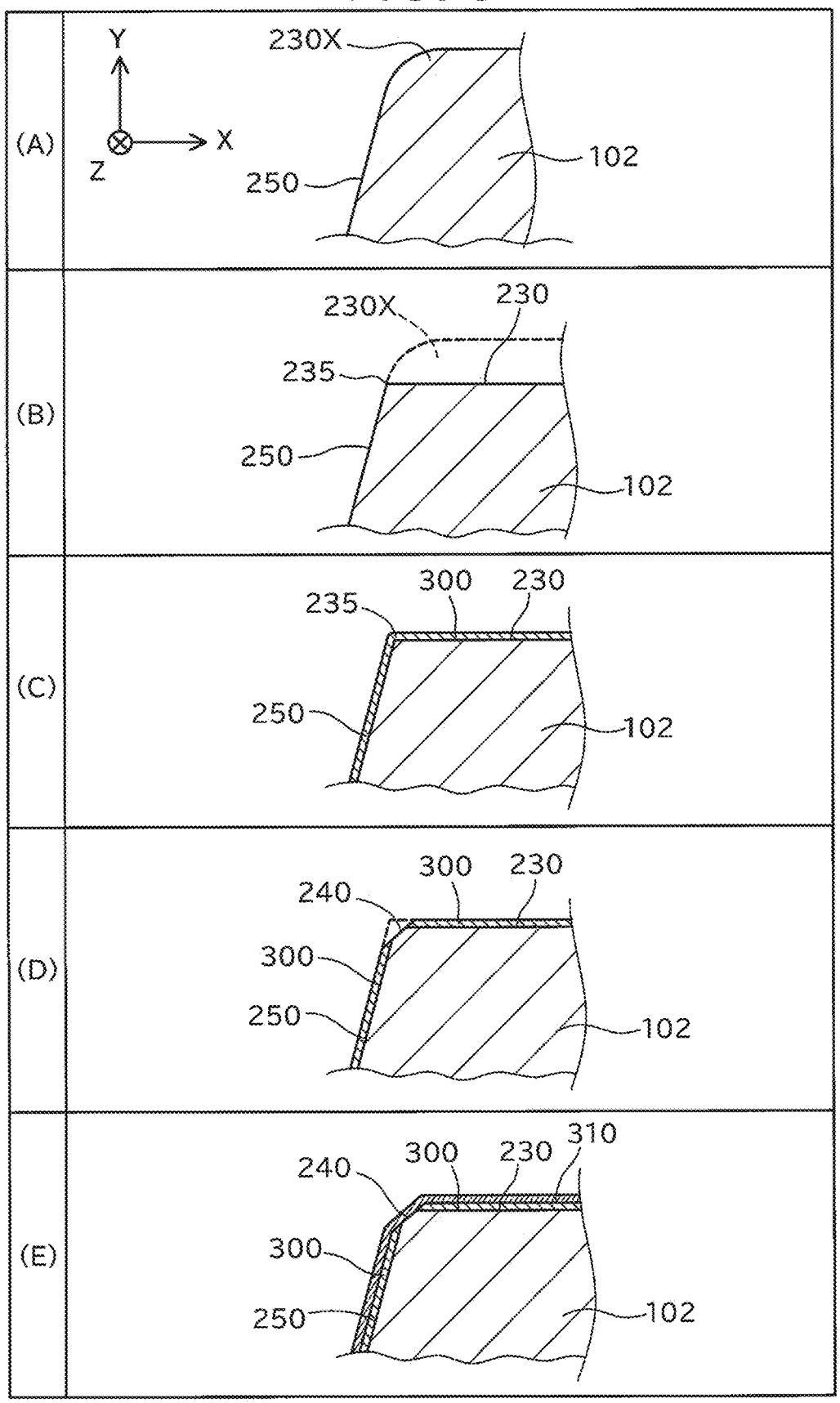
FIG. 5 is an explanatory drawing illustrating parts of the process for manufacturing the vehicle wheel 100.

A method for manufacturing the wheel 100 is described. FIG. 4 is a flowchart illustrating a process for manufacturing the wheel 100. FIG. 5 is an explanatory drawing illustrating parts of the process for manufacturing the wheel 100.

As illustrated in FIG. 4, a pre-processed light metal wheel workpiece 102 is first formed (S110). For example, the pre-processed wheel workpiece 102 is formed by known casting or forging using a light metal material. Part (A) of FIG. 5 illustrates an XY section of the pre-processed wheel workpiece 102. The pre-processed wheel workpiece 102 is an example of a light metal workpiece of a wheel that is formed in a forming step in the disclosure. Step S110 is an example of the forming step in the disclosure.

Next, a cut surface 230 is formed by cutting a superficial part 230X of the pre-processed wheel workpiece 102 on the outer side (S120). Part (B) of FIG. 5 illustrates an XY section of the wheel workpiece 102 obtained after the superficial part 230X is cut from the pre-processed wheel workpiece 102 in Part (A) of FIG. 5. The cut surface 230 is a substantially flat surface. By forming the cut surface 230, the cut wheel workpiece 102 has an edge 235 where the cut surface 230 intersects an inclined surface 250. The cutting can be performed by using a machining apparatus such as a milling machine or a lathe. The cut wheel workpiece 102 is an example of the workpiece of the wheel that has a cut surface formed in a cutting step in the disclosure. Step S120 is an example of the cutting step in the disclosure.

Next, the entire surface of the cut wheel workpiece 102 on the outer side is coated with a colored paint (S130). Specifically, the cut surface 230, the edge 235, and a portion around the edge 235 (for example, the inclined surface 250) are coated in the cut wheel workpiece 102. The colored paint may be a chromatic color paint or an achromatic color paint. Part (C) of FIG. 5 illustrates an XY section of the cut wheel workpiece 102 that has a color coat layer 300 formed over the cut surface 230, the inclined surface 250, and the edge 235. Step S130 is an example of a coating step in the disclosure.

Next, the edge 235 of the cut and coated wheel workpiece 102 is chamfered (S140) to form a bright surface 240 where the wheel workpiece 102 is exposed. Part (D) of FIG. 5 illustrates an XY section of the wheel workpiece 102 that has the bright surface 240 formed between the color coat layer 300 on the cut surface 230 and the color coat layer 300 on the inclined surface 250 by chamfering. In this embodiment, the chamfering is performed by machining using, for example, a numerical control (NC) machine.

The shape of the edge 235 viewed in the wheel axial direction is a substantially triangular shape having round vertices along the opening 12. The edge 235 includes straight portions (see symbols D in FIG. 1) and curved portions (see symbols C in FIG. 1). In the chamfering step, the bright surface 240 is formed to enclose (surround) the opening 12 by continuously chamfering the edge 235 along the shape of the edge 235. Step S140 is an example of a chamfering step in the disclosure. As described above, the pre-chamfered edge 235 has the shape including the straight portions and the curved portions. The bright surface 240 formed by chamfering similarly has a substantially triangular shape having round vertices, and includes straight portions and curved portions.

Next, a clear coat layer 310 is formed by coating the chamfered wheel workpiece 102 (S150). For example, corrosion of the wheel 100 is prevented.

A-3. Effects of First Embodiment

As described above, in the method for manufacturing the wheel 100 according to this embodiment, the cut surface 230, the edge 235, and the inclined surface 250 of the cut wheel workpiece 102 are color-coated in the coating step (S130). Then, the edge 235 of the cut wheel workpiece 102 is chamfered in the chamfering step (S140) to expose the wheel workpiece 102. Thus, the wheel 100 is manufactured to have the bright surface 240 formed along the edge 235. The wheel workpiece 102 is exposed in the bright surface 240. That is, the wheel 100 can be manufactured to have a high design property (i.e., a good appearance) by visually emphasizing the bright surface 240 positioned at the boundary between the cut surface 230 and the inclined surface 250.

In this embodiment, the chamfering is performed by machining in the chamfering step (S140). Thus, it is possible to perform highly accurate chamfering such that irregularities are reduced, as compared to, for example, a case where chamfering is performed manually.

B. Second Embodiment

Figure 6:
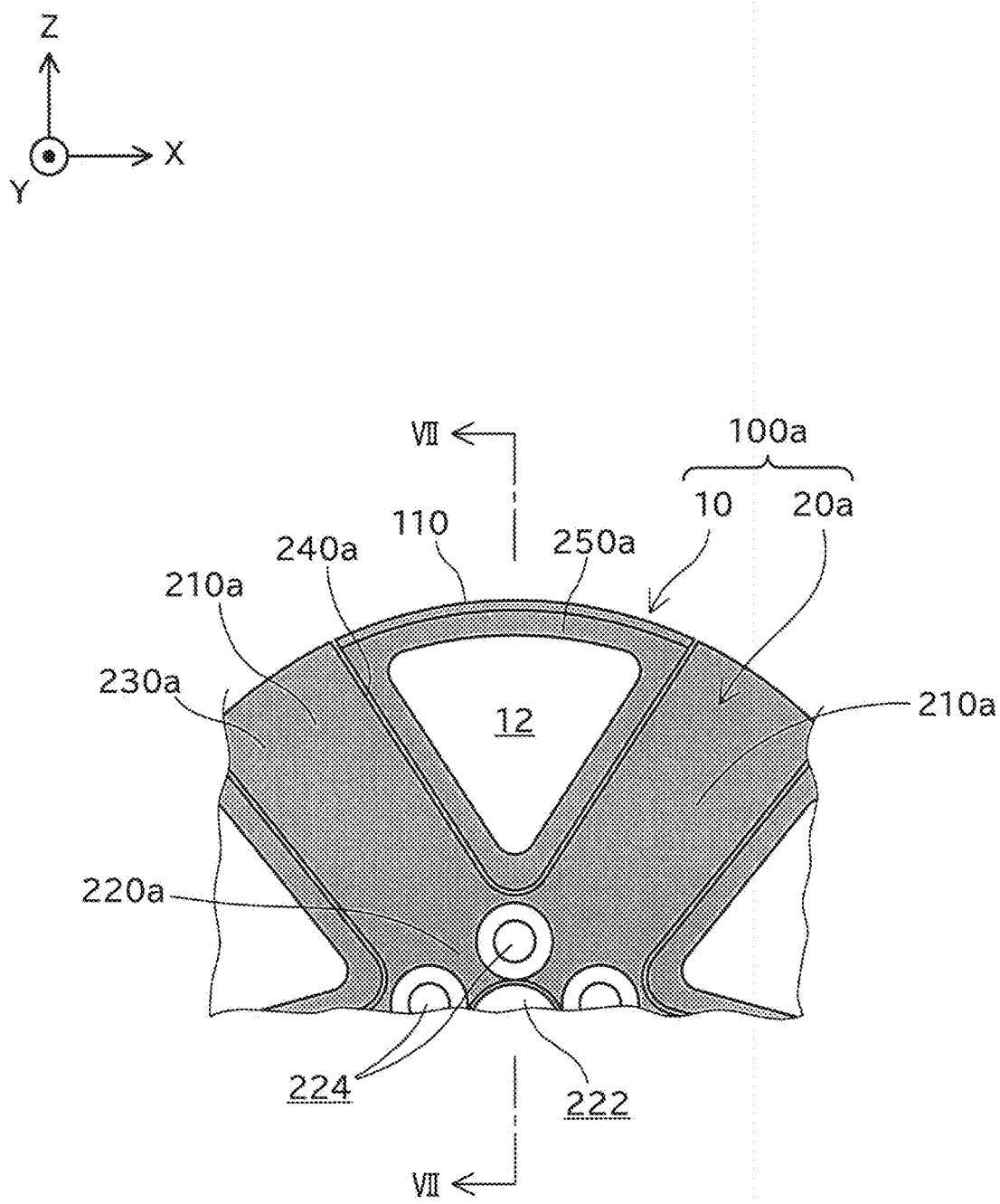
FIG. 6 is an XZ plan schematically illustrating the external structure of a part of a vehicle wheel 100a according to a second embodiment.
Figure 7:
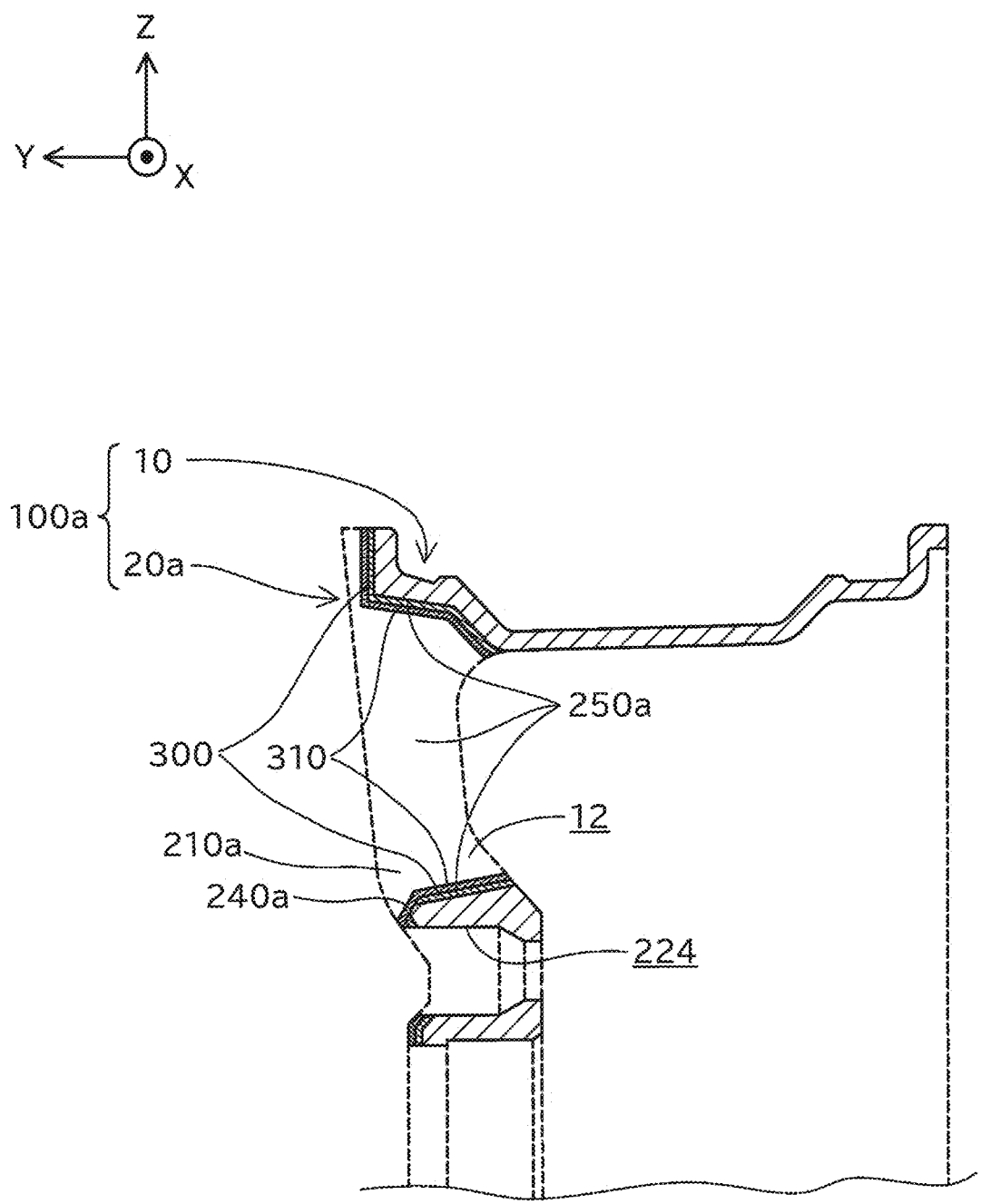

FIG. 6 is an XZ plan schematically illustrating the external structure of a part of a wheel 100a according to a second embodiment. FIG. 7 is an explanatory drawing schematically illustrating a YZ sectional structure of the wheel 100a. FIG. 7 illustrates a YZ sectional structure of the wheel 100a at a position VII-VII in FIG. 6. Among components of the wheel 100a of the second embodiment, components identical to the components of the wheel 100 of the first embodiment are represented by the same reference symbols to omit their description as appropriate.

In the first embodiment, the shape of the bright surface 240 formed on the wheel 100 is a substantially triangular loop shape when viewed in the wheel axial direction. In the second embodiment, the shape of a bright surface 240a formed on the wheel 100a is a partially discontinuous non-loop shape when viewed in the wheel axial direction.

Specifically, as illustrated in FIG. 6, the shape of the bright surface 240a formed on the wheel 100a includes a pair of straight portions arranged substantially in a V-shape, and a curved portion connecting the straight portions. The curved portion is disposed near a hub attachment portion 220a. Each of the straight portions extends from the curved portion to the perimeter of a wheel disc 20a along a longitudinal direction of a spoke 210a (wheel radial direction).

A cut surface 230a of the wheel disc 20a extends to the perimeter of the wheel disc 20a. A part of the perimeter of the wheel disc 20a between the straight portions of the bright surface 240a is an arc portion conforming to the outer peripheral shape of the wheel disc 20a. As illustrated in FIG. 7, an edge where the arc portion intersects an inclined surface 250a is not chamfered, and the bright surface 240a is not present. The bright surface may be formed by chamfering the edge.

C. Modified Examples

The technology disclosed herein is not limited to the embodiments described above, and may be modified in various embodiments without departing from the scope of the technology. For example, the following modifications may be employed.

In the embodiments described above, the wheel 100 or 100a (wheel workpiece 102) is the one-piece wheel, but the kind of the wheel is not limited to the one-piece wheel, and may be a so-called two-piece wheel in which the wheel rim 10 and the wheel disc 20 or 20a are provided separately. In the embodiments described above, the wheel 100 or 100a including the spokes 210 or 210a is exemplified as the vehicle wheel, but the vehicle wheel is not limited to the wheel 100 or 100a, and may be a wheel without the spokes.

In the embodiments described above, the chamfering may be intermittently performed on the edge 235 in the chamfering step (S140). When forming the bright surface 240 or 240a, the edge 235 may be machined in one or more cycles, or the chamfering may be performed while changing a machining width on the edge 235 (width of the linear portion of the bright surface 240 or 240a obtained after machining).

In the embodiments described above, the bright surface 240 or 240a positioned at the boundary between the cut surface 230 or 230a and the inclined surface 250 or 250a is exemplified as the bright surface obtained after the chamfering, but the bright surface is not limited to the bright surface 240 or 240a. The bright surface 240 or 240a may be positioned at any location as long as the bright surface 240 or 240a is positioned at a boundary between two adjacent surfaces (the cut surface and the surface of the workpiece) that are different in angles with respect to the wheel axial direction and define an edge. A relative angle between the cut surface and the surface of the material may be, for example, less than 140°, and may be, for example, 130° or more. In the cross section of the spoke 210 or 210a that is perpendicular to the longitudinal direction of the bright surface 240 or 240a, the bright surface 240 or 240a is not limited to the substantially straight surface, and may be a convex surface or a concave (for example, U-shaped) surface. In the wheel 100 or 100a, the bright surface 240 or 240a may be coated with a colored paint different from that for the cut surface 230 or 230a and the inclined surface 250 or 250a. The shape of the bright surface 240 is not limited to the substantially triangular shape, and may be any other polygonal shape or a circular shape. The shape of the bright surface 240a is not limited to the substantial V-shape, and may be an arc shape or the like.

The materials for the individual members in the embodiments described above are examples. The individual members may be made of other materials.

The method for manufacturing the wheel 100 or 100a in the embodiments described above is an example, and may be modified variously. For example, the cutting (S120) may be performed by using a known cutter such as a machining center. The chamfering (S140) may be performed by manual work (manually) using a file or the like, instead of performing the chamfering by machining. In the manufacturing method, the coating step (S150) may be omitted.

What is claimed is:

1. A method for manufacturing a vehicle wheel that includes a cylindrical wheel rim and a wheel disc provided on an inner peripheral side of the cylindrical wheel rim, the method comprising:
    forming a metal alloy workpiece that will become the vehicle wheel by casting or forging;
    cutting a part of the workpiece to form a cut surface, the cutting also forming an edge between the cut surface and an inclined surface of the workpiece that intersects and is adjacent to the cut surface and that is inclined relative to the cut surface;
    coating, with a colored paint: (i) the cut surface, (ii) the edge, and (iii) at least a portion of the inclined surface of the workpiece adjacent to the edge; and
    after the cutting, chamfering the edge to remove the colored paint and a portion of the metal alloy workpiece at the edge to form a bright surface where the metal alloy of the workpiece is exposed, the bright surface being bordered on a first side by the colored paint that is coated on the cut surface and being bordered on a second side, opposite the first side, by the colored paint that is coated on the portion of the inclined surface.

2. The method according to claim 1, wherein the chamfering of the edge is performed by machining.

3. The method according to claim 1, wherein a width of the bright surface that is formed is in a range of 0.3 mm to 2 mm.

\* \* \* \* \*